METHOD OF MANUFACTURING RELIABLE MAGNETIC HEADS HAVING ACCURATELY PREDETERMINED DIMENSIONS

Original Filed March 5, 1962

INVENTOR.
SIMON DUINKER
BY
Frank R. Trifari
AGENT 3,354,540

METHOD OF MANUFACTURING RELIABLE MAGNETIC HEADS HAVING ACCURATELY PREDETERMINED DIMENSIONS

Simon Duinker, Emmasingel, Eindhoven, Netherlands, assignor to North American Philips Company, Inc., New York, N.Y., a corporation of Delaware Continuation of abandoned application Ser. No. 177,654, Mar. 5, 1962. This application Mar. 7, 1966, Ser. No. 533,134
Claims priority, application Netherlands, Apr. 7, 1961, 263,324
8 Claims. (Cl. 29—603)

ABSTRACT OF THE DISCLOSURE

A method of manufacturing a plurality of magnetic heads from a block of ferrite material including the steps of forming a set of shallow grooves in the top face of the block, filling the grooves with nonmagnetic strengthening material, cutting a V-shaped groove into the side face of the block, filling the V-shaped groove with non-magnetic material, placing a second block against the first block and bonding the blocks together, and slicing across the joined blocks to form a plurality of heads in accordance with the first set of grooves.

This application is a continuation of application Ser. No. 177,654, filed Mar. 5, 1962, and now abandoned.

In the magnetic recording of video-frequency signals, tracks are used which generally have widths of from 150 to 350 microns. In order to be able to write such a narrow track, heads must be used having a corresponding narrow bearing surface. As heretofore known, such heads have been made of ferrite and have been manufactured by laterally tapering a wider head, having a width of, for example, 1.5 mm. on the side of the bearing surface and then enveloping it on the said side with enamel, both for mechanical strengthening and for preventing the magnetic tape from being cut to pieces by the head; the resulting structure is then ground and polished so that the narrow ferrite bearing surface again appears but now laterally widened with enamel.

This method is difficult, time-consuming and costly; it also incurs a high reject percentage owing to breakage on tapering, because the cross-section of the ferrite, a very brittle material is extremely small at the gap face, namely approximately 0.02 $mm.^2$. In addition, the tapering increases the magnetic resistance of the head which results in a low efficiency during operation.

An additional drawback of the known method is that, when the bearing surface is polished in order to reduce the gap height to the desired value, the width is also simultaneously increased inevitably.

A primary object of the invention is to provide a method for manufacturing magnetic heads used for transducing video signals in which the heads may be reliably manufactured to the proper dimensions.

In the method according to the invention, as in a known method for manufacturing magnetic heads, two ferrite plates are used as starting material which, at some stage in the manufacture, are united to one assembly with the interposition of a thin gap-forming and adhering layer of high-melting non-magnetic material, for example glass. See, for example, U.S. Patent 3,024,318, assigned to the assignee of the instant application.

According to one aspect of the present invention, one or more sets of two shallow grooves are made in one of the faces of one of the ferrite plates before the ferrite plates are united; these grooves are made to meet one another at one of the edges of the face and are filled with non-magnetic strengthening material. Then, in the side face abutting said edge, a V-shaped groove is ground and filled with non-magnetic material which, the V-shaped groove extending parallel to said edge and at a distance therefrom which exceeds slightly the desired gap height of the head; subsequently so much of the said side face is ground and/or polished away that the strips of the plate material which appear between every two layers of strengthening material extending into said side face have a width which is equal to the desired width of the track to be written or read by the head.

In order that the invention may readily be carried into effect, embodiments thereof will now be described more fully, by way of example, with reference to the accompanying drawing wherein FIGURE 1 shows an isometric view of a ferrite plate, comprising a plurality of sets of two grooves which are filled with glass;

Figure 1:
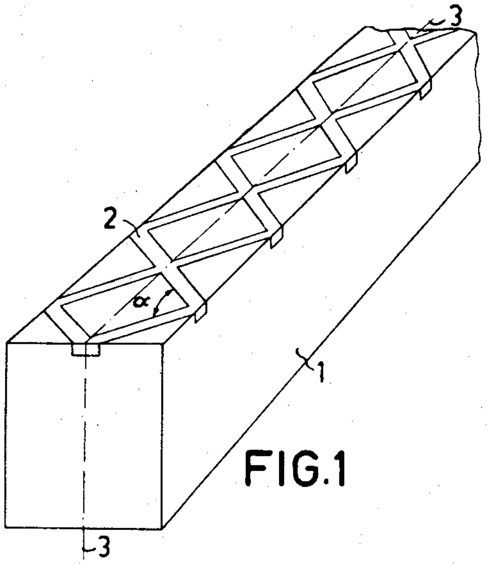

As shown in the drawing, a ferrite block 1 has a plurality of sets of two flat shallow grooves 2 provided in its top face, the grooves extending into the side faces of the block. These grooves are filled with a non-magnetic strengthening material, for example glass, the coefficient of expansion of which is substantially the same as that of the ferrite and the softening point of which is high, for example 700° C.

The block is then sawed in two along the dotted line 3, as a result of which two plates are obtained each including a number of sets of two grooves all extending into the side faces. One head can be made from each set, so that from the block shown in FIG. 1 for example ten heads may be made; this number, however, may be extended at will limits by starting from a longer block.

The angle $\alpha$ at which the grooves entersect one another and which determines the apical angle of the tapered head may be rather arbitrary. Good results have been obtained with angles of 60° and 90°, the plate material consisting in this case of a NiZn-ferrite sintered to compactness and the strengthening material consisting of a lead glass, the softening of which started at approximately 650° C.

Figure 2:
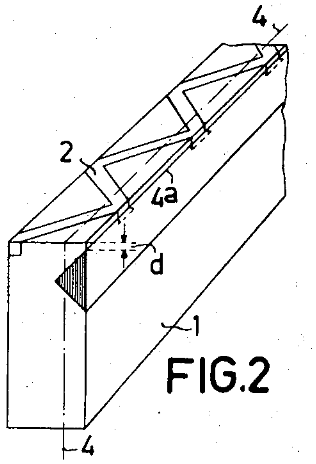
FIGURE 2 shows a view of this plate after cutting through and after a V-shaped groove is provided.

As shown in FIGURE 2 a V-shaped groove 4 is then ground in the side face of the plate into which the grooves 2 extend, the aperture angle of the groove preferably being approximately 90°; and the upper side 4*a* of the groove extends parallel to the top face of the plate and at a distance *d* therefrom which is somewhat smaller than the desired gap height of the finished head. The depth of the groove 2 may be chosen somewhat greater, so that on grinding the V-shaped groove 4 part of the glass contained in the grooves 2 is also ground away. Then the groove 4 is filled with a non-magnetic strengthening and adhering material, for example enamel, the coefficient of expansion of which is adapted to that of the plate materials and the softening point of which also is rather high, but preferably a little lower than that of the glass in the grooves 2.

Figure 3:
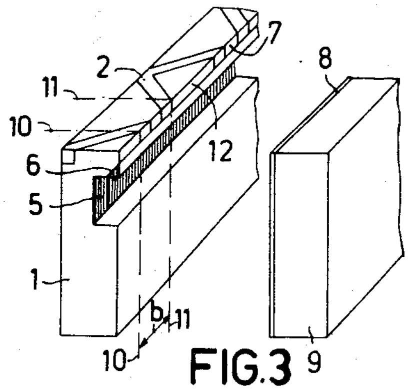
FIGURE 3 shows the same view as FIGURE 2 but after a rectangular groove has been made for the coil and after the plate has been ground and polished.

In order to be able to use an unprofiled counter plate which is combined with the plate 1 to form the completed head, a rectangular groove 5 (FIG. 3) is ground in the side face of the plate 1 to make room for the coil. It is preferable as shown in FIGURE 3 to cause the upper side wall of the groove 5 to coincide approximately with the central plane of the V-shaped groove 4, since there will remain the most useful half 6 of the triangular strengthening beam cast in this groove with respect to the path of lines of force while the coil is located as near as possible to the gap, this results in a compact structure and contributes toward proper functioning of the head. However, if desired, the space for the coil may also be provided in the counter plate.

The side face of the plate 1 is then ground flat and polished, this step being continued until the material of the side face appears in the form of a narrow strip 7 which becomes gradually wider. Polishing is discontinued as soon as the width of this strip has become equal to the desired width of the magnetic track cooperating with the head to 200 microns. Then the plate is ready to be combined with the counter plate.

For that purpose, the polished side face of the plate 1 is placed next to the face of the ferrite counter plate 9 with the interposition of a thin adhering layer 8 (FIGURE 3) consisting of glass or solder, after which the two plates are cemented together in known manner at high temperature. The thickness of the adhering layer 8 determines the desired gap length of the head and may amount to, for example, 2 microns for transducing video signals. The temperature of cementing should not be so high that the strengthening material tends to flow out of the grooves 2 and/or 4. As can be seen from the drawing, the counter plate 9 is polished but need not be profiled.

Then the assembly of the plates 1 and 9 is cut off along the dotted lines 10 and 11 (FIG. 3) which are located symmetrically with respect to the strip 7 with a distance *b* between them, this distance being equal to the desired width of the track to be written with the finished head, for example 200 microns.

Figure 4:
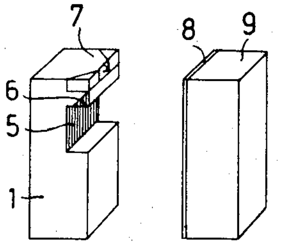
FIGURE 4 is a view of the plate in combination with the associated counter plate.
Figure 5:
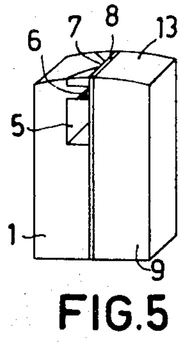
FIGURES 5 and 6 are views of complete head cut from the united plates.

The portion cut out of the plates in this manner is shown in FIG. 4 and its bearing surface must be treated so that it is given the desired shape (flat, cylindrical or curved) and at the same time the gap 12 is given the desired height. If a cylindrical bearing surface is desired, it is ground and polished, for example, along the curved plane 13 in FIG. 5. It is noted that in this operation only the gap height becomes gradually smaller; the width of the strip 7 which determines the width of the track remains unchanged. As a result of the presence of the strengthening beam 6, effective gap heights (corresponding to the smallest remaining height of the magnetic material) can be realized in this manner which can be as much as 25 microns. In addition it is important that the effective magnetic cross-section of the circuit of the head be much greater everywhere than at the useful gap, so that the ratio of the magnetic resistances of the gap and the remainder of the said strip is as small as possible and consequently the efficiency of the head is as great as possible. Dependent on the depth and height of the gap, has been found that heads may be obtained having an efficiency of 75%.

Figure 6:
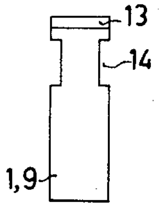

For some uses it is desirable to provide the winding so that it lies within the contours of the head. For this purpose, grooves 14 such as shown in FIGURE 6 may be ground into the plates 1 and 9 at the height of the winding space 5.

While preferred embodiments of the invention have been described, it will be obvious to those skilled in the art that various changes and modifications may be made therein without departing from the inventive concept.

What I claim is:

1. A method of manufacturing portions of magnetic heads for video-frequency signals, comprising: forming at least one set of two relatively shallow grooves in the top face of a first ferrite plate, each pair of grooves of a set meeting at one of the edges of said top face, filling said grooves with a nonmagnetic strengthening material at a first temperature at which said material fuses and is bonded to said ferrite, cutting a V-shaped groove in the side face of said plate abutting said edge, said V-shaped groove extending parallel to said edge, the upper edge of said V-shaped groove being at a distance from said edge which exceeds the desired gap height of the head, filling said V-shaped groove with a nonmagnetic material at a second temperature at which said material fuses and is bonded to said ferrite, said second temperature being lower than said first temperature, and removing so much of said side face that the portions of the ferrite plate which appear between every two portions of strengthening material located in the relatively shallow grooves of one set have a width which is equal to the desired width of the track to be transduced by the head.

2. A method of manufacturing portions of magnetic heads for video-frequency signals, comprising: forming at least one set of two relatively shallow grooves in the top face of a first ferrite plate, each pair of grooves of a set meeting at one of the edges of said top face, filling said grooves with a nonmagnetic strengthening material at a first temperature at which said material fuses and is bonded to said ferrite, cutting a V-shaped groove in the side face of said plate abutting said edge, said V-shaped groove extending parallel to said edge, the upper edge of said V-shaped groove being at a distance from said edge which exceeds the desired gap height of the head, filling said V-shaped groove with a nonmagnetic material at a second temperature at which said material fuses and is bonded to said ferrite, said second temperature being lower than said first temperature, forming a substantially rectangular groove in said side face, said rectangular groove having a top surface extending substantially parallel to said top face, said top surface substantially coinciding with the central plane of said V-shaped groove, and removing so much of said side face that the portions of the ferrite plate which appear between every two portions of strengthening material located in the relatively shallow grooves of one set have a width which is equal to the desired width of the track to be transduced by the head.

3. A method of manufacturing portions of magnetic heads for video-frequency signals, comprising: forming at least one set of two relatively shallow grooves in the top face of a first ferrite plate, each pair of grooves of a set meeting along a line parallel to one of the edges of said top face, filling said grooves with a nonmagnetic strengthening material at a first temperature at which said material fuses and is bonded to said ferrite, cutting said first ferrite plate along said line thereby forming a second ferrite plate having sets of pairs of shallow grooves meeting at one of the edges of said second plate, cutting a V-shaped groove in the side face of said second plate abutting said edge, said V-shaped groove extending parallel to said edge, the upper edge of said V-shaped groove being at a distance from said edge which exceeds the desired gap height of the head, filling said V-shaped groove with a nonmagnetic material at a second temperature at which said material fuses and is bonded to said ferrite, said second temperature being lower than said first temperature, and removing so much of said side face that the portions of the ferrite plate which appear between every two portions of strengthening material located in the relatively shallow grooves of one set have a width which is equal to the desired width of the track to be transduced by the head.

4. A method of manufacturing portions of magnetic heads for video-frequency signals, comprising: forming at least one set of two relatively shallow grooves in the top face of a first ferrite plate, each pair of grooves of a set meeting at one of the edges of said top face, filling said grooves with a nonmagnetic strengthening material at a first temperature at which said material fuses and is bonded to said ferrite, cutting a V-shaped groove in the side face of said plate abutting said edge, said V-shaped groove extending parallel to said edge, the upper edge of said V-shaped groove being at a distance from said edge which exceeds the desired gap height of the head, filling said V-shaped groove with a nonmagnetic material at a second temperature at which said material fuses and is bonded to said ferrite, said second temperature being lower than said first temperature, removing so much of said side face that the portions of strengthening material located in the relatively shallow grooves of one set have a width which is equal to the desired width of the track to be transduced by the head, placing a side face of a second ferrite plate opposite said side face of said first ferrite plate with the interposition of a nonmagnetic material which fuses at a third temperature lower than said second temperature, heating the assembly to said third temperature, and allowing the assembly to cool.

5. A method of manufacturing portions of magnetic heads for video-frequency signals, comprising: forming at least one set of two relatively shallow grooves in the top face of a first ferrite plate, each pair of shallow grooves of a set meeting at one of the edges of said top face, filling said shallow grooves with a nonmagnetic strengthening material at a first temperature at which said material fuses and is bonded to said ferrite, cutting a groove in the side face of said plate abutting said edge, said groove extending parallel to said edge, the upper edge of said groove being at a distance from said edge which exceeds the desired gap height of the head, filling said groove with a nonmagnetic material at a second temperature at which said material fuses and is bonded to said ferrite, said second temperature being lower than said first temperature, and removing so much of said side face that the portions of the ferrite plate which appear between every two portions of strengthening material located in the relatively shallow grooves of one set have a width which is equal to the desired width of the track to be transduced by the head.

6. A method of manufacturing portions of magnetic heads for video-frequency signals, comprising: forming at least one set of two relatively shallow grooves in the top face of a first ferrite plate, each pair of shallow grooves of a set meeting at one of the edges of said top face, filling said shallow grooves with a nonmagnetic strengthening material at a first temperature at which said material fuses and is bonded to said ferrite, cutting a V-shaped groove in the side face of said plate abutting said edge, said V-shaped groove extending parallel to said edge, the upper edge of said V-shaped groove being at a distance from said edge which exceeds the desired gap height of the head, filling said V-shaped groove with a nonmagnetic material at a second temperature at which said material fuses and is bonded to said ferrite, said second temperature being lower than said first temperature, forming a substantially rectangular groove in said side face, said rectangular groove having a top surface extending substantially parallel to said top face, said top surface substantially coinciding with the central plane of said V-shaped groove, and removing so much of said side face that the portions of the ferrite plate which appear between every two portions of strengthening material located in the relatively shallow grooves of one set have a width which is equal to the desired width of the track to be transduced by the head.

7. A method of manufacturing portions of magnetic heads for video-frequency signals, comprising: forming at least one set of two relatively shallow grooves in the top face of a first ferrite plate, each pair of shallow grooves of a set meeting along a line parallel to one of the edges of said top face, filling said shallow grooves with a nonmagnetic strengthening material at a first temperature at which said material fuses and is bonded to said ferrite, cutting said first ferrite plate along said line thereby forming a second ferrite plate having sets of pairs of shallow grooves meeting at one of the edges of said second plate, cutting a V-shaped groove in the side face of said second plate abutting said edge, said V-shaped groove extending parallel to said edge, the upper edge of said V-shaped groove being at a distance from said edge which exceeds the desired gap height of the head, filling said V-shaped groove with a nonmagnetic material at a second temperature at which said material fuses and is bonded to said ferrite, said second temperature being lower than said first temperature, and removing so much of said side face that the portions of the ferrite plate which appear between every two portions of strengthening material located in the relatively shallow grooves of one set have a width which is equal to the desired width of the track to be transduced by the head.

8. A method of manufacturing portions of magnetic heads for video-frequency signals, comprising: forming at least one set of two relatively shallow grooves in the top face of a first ferrite plate, each pair of shallow grooves of a set meeting at one of the edges of said top face, filling said shallow grooves with a nonmagnetic strengthening material at a first temperature at which said material fuses and is bonded to said ferrite, cutting a V-shaped groove in the side face of said plate abutting said edge, said V-shaped groove extending parallel to said edge, the upper edge of said V-shaped groove being at a distance from said edge which exceeds the desired gap height of the head, filling said V-shaped groove with a nonmagnetic material at a second temperature at which said material fuses and is bonded to said ferrite, said second temperature being lower than said first temperature, removing so much of said side face that the portions of the ferrite plate which appear between every two portions of strengthening material located in the relatively shallow grooves of one set have a width which is equal to the desired width of the track to be transduced by the head, placing a side face of a second ferrite plate opposite said side face of said first ferrite plate with the interposition of a nonmagnetic material which fuses at a third temperature lower than said second temperature, heating the assembly to said third temperature, and allowing the assembly to cool.

References Cited

UNITED STATES PATENTS

| | | | |
|---|---|---|---|
| 2,961,709 | 11/1960 | Eichbaum et al. | 29—155.6 |
| 3,117,367 | 1/1964 | Duinker et al. | 29—155.5 |

CHARLIE T. MOON, *Primary Examiner.*

R. W. CHURCH, *Assistant Examiner.*